United States Patent [19]

Ludwig

[11] 3,993,503
[45] Nov. 23, 1976

[54] SECONDARY BATTERY OR CELL WITH COMPOSITE ELECTRODE

[75] Inventor: Frank A. Ludwig, Southfield, Mich.

[73] Assignee: Ford Motor Company, Dearborn, Mich.

[22] Filed: Jan. 30, 1976

[21] Appl. No.: 653,858

[52] U.S. Cl. .............................. 429/103; 429/188
[51] Int. Cl.² ...................................... H01M 10/00
[58] Field of Search .......... 136/6 FS, 6 F, 20, 83 R, 136/6 R

[56] References Cited
UNITED STATES PATENTS

| | | | |
|---|---|---|---|
| 3,883,367 | 5/1975 | Chiku et al. | 136/6 F |
| 3,922,176 | 11/1975 | Robinson et al. | 136/6 FS |
| 3,932,195 | 1/1976 | Evans et al. | 136/6 FS |

*Primary Examiner*—John H. Mack
*Assistant Examiner*—C. F. LeFevour
*Attorney, Agent, or Firm*—Roger L. May; Keith L. Zerschling

[57] ABSTRACT

An improved secondary battery or cell of the type having: (A) one or more anodic reaction zones containing a molten alkali metal reactant-anode in electrical contact with an external circuit; (B) one or more cathodic reaction zones containing (1) a cathodic reactant which, when said battery or cell is at least partially discharged, is selected from the group consisting of (i) a single phase composition comprising molten polysulfide salts of said anodic reactant and (ii) a two-phase composition comprising molten sulfur and molten sulfur saturated polysulfide salts of said anodic reactant and (2) an electrode which is at least partially filled with said cathodic reactant; and (C) a cation-permeable barrier to mass liquid transfer interposed between and in contact with said anodic and cathodic reaction zones, said electrode being in electrical contact with both said cation-permeable barrier and an external circuit. The improvement comprises a composite electrode comprising (a) at least one first portion of porous conductive material which is more readily wet by molten polysulfide than by molten sulfur and (b) at least one second portion of porous conductive material which is more readily wet by molten sulfur than by molten polysulfide.

31 Claims, 6 Drawing Figures

U.S. Patent  Nov. 23, 1976  3,993,503
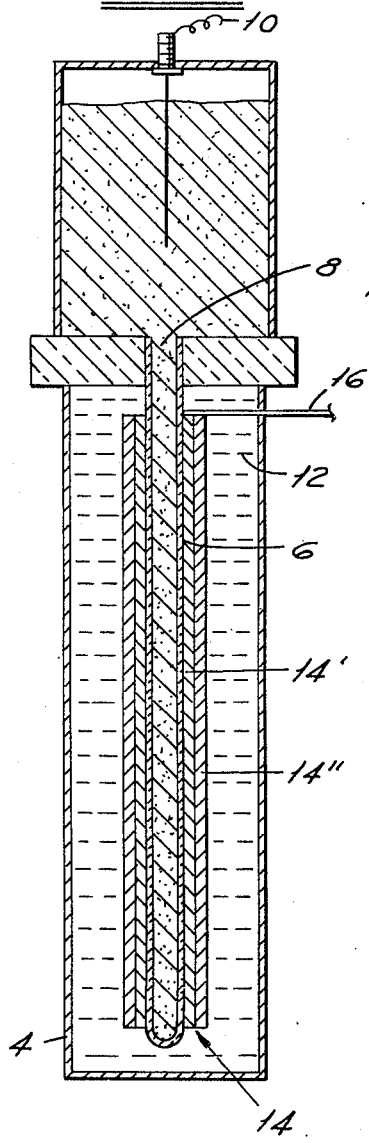
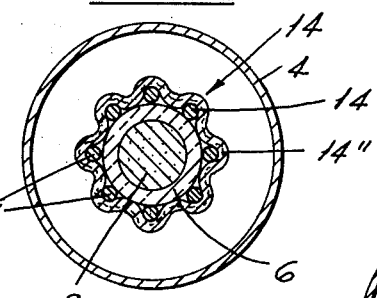
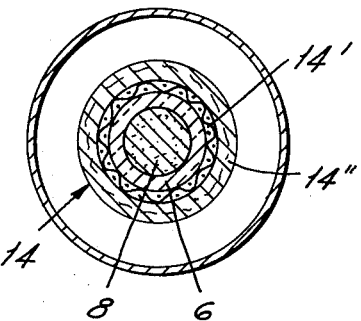
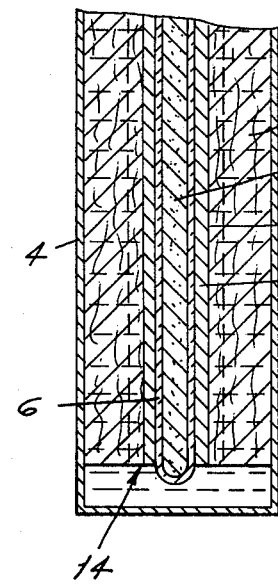
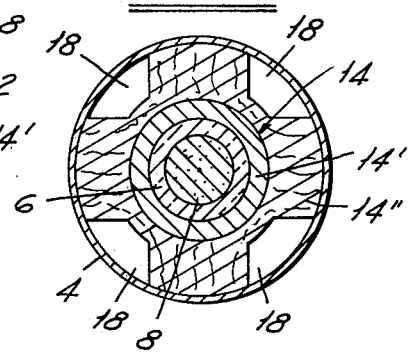
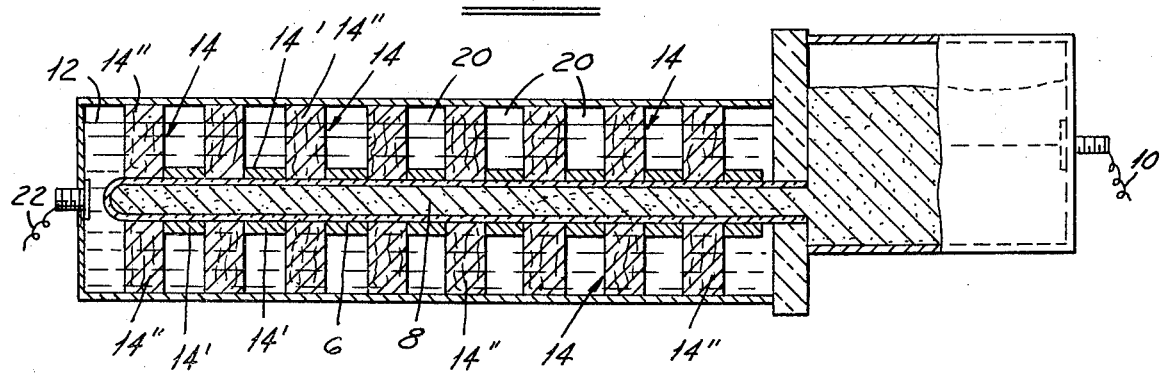

SECONDARY BATTERY OR CELL WITH COMPOSITE ELECTRODE

The invention described was made in the course of or under a contract or subcontract thereunder with the National Science Foundation.

This application relates to an improved secondary cell or battery of the type comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

More particularly, this application relates to an improved alkali metal/sulfur battery or cell which exhibits increased energy efficiency on both charge and discharge and which as a result is especially useful for, but not limited to use in electric utility load leveling applications. Still more particularly, this application relates to an improved alkali metal/sulfur battery which includes a composite electrode with portions thereof being optimized for charging and portions thereof being optimized for discharging.

BACKGROUND OF THE INVENTION

A recently developed type of secondary or rechargeable electric conversion device comprises: (1) an anodic reaction zone containing a molten alkali metal anode-reactant, e.g., sodium, in electrical contact with an external circuit; (2) a cathodic reaction zone containing (a) a cathodic reactant comprising sulfur or a mixture of sulfur and molten polysulfide, which is electrochemically reversibly reactive with said anodic reactant; (b) a solid electrolyte comprising a cation-permeable barrier to mass liquid transfer interposed between and in contact with said anoidic and cathodic reaction zones; and (c) electrode means within said cathodic reaction zone for transporting electrons to and from the vicinity of said cation-permeable barrier. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the electrode by reaction of the cathodic reactant with electrons conducted through the electrode from the external circuit. Because the ionic conductivity of the liquid electrolyte is less than the electronic conductivity of the electrode material, it is desirable during discharge that both electrons and sulfur be applied to and distributed along the surface of the electrode in the vicinity of the cation-permeable solid electrolyte. When the sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus, electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the electrode, charge transfer is inhibited and the charging process is greatly hindered or terminated. Thus, in order to improve the rechargeability of a cell of this type it is necessary not only to supply polysulfide to the surface of the electrode in the vicinity of the cation-permeable but also to remove sulfur therefrom.

Numerous suggestions have been made for improving the mass transportation of cathodic reactants so as to improve charge and discharge efficiency as well as to increase the ampere hour capacity of the battery or cell.

U.S. Pat. No. 3,811,493 and U.S. patent application Ser. No. 545,048 filed Jan. 29, 1975 both disclose energy conversion device designs which allow or promote improved mass transportation of reactants and charge thus increasing both energy efficiency and the ampere-hour capacity of the device. In the device disclosed in the patent an ionically conductive solid electrolyte is located between a first reactant in one container and a second reactant in another container. An electrode for one of the reactants comprises a layer of porous, electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive member distributes electrons to the porous, conductive material which, in turn, transfers electrons to or from the reactants.

The improvement disclosed in the patent applications comprises designing the cathodic reaction zone of the device such that there are a plurality of channels and/or spaces within said zone which are free of porous conductive electrodes and which are thus adapted to allow free flow of the molten cathodic reactants during operation of the device. This flow results from free convection within the channels and/or spaces, and from wicking of cathodic reactants within the conductive porous material.

U.S. patent applications Ser. No. 567,464 filed Apr. 14, 1975 and Ser. Nos. 604,941 and 605,942 filed Aug. 20, 1975 all teach ways of increasing mass transportation of reactants in such a device, thus increasing the ampere-hour capacity of the battery or cell and, to an extent, the charge/discharge energy efficiency. However, each of these modifications relies on vapor transport of sulfur to accomplish its purpose and, as such, involves either external heating or special cell design.

The prior art designs or methods disclosed and claimed in the aforementioned U.S. patent and in Ser. Nos. 545,048, 605,941 and 605,942 are all effective in promoting distribution of reactants during both discharge and charge. However, even with these improved designs or methods it is difficult to recharge the batteries or cells at high rates.

U.S. patent application Ser. No. 653,865 entitled "Secondary Battery or Cell with Polysulfide Wettable Electrode" filed concurrently herewith teaches a secondary battery or cell employing an electrode which is preferentially wet by polysulfide. As a result, the cell exhibits a high energy efficiency on charge. The use of such a polysulfide wettable, electrode, however, while increasing charge efficiency, results in appreciable electrode polarization and somewhat decreased efficiency on discharge.

U.S. patent application Ser. No. 653,857 entitled "Secondary Battery or Cell with Dual Electrode" and also filed concurrently herewith teaches a battery or cell in which each cell contains two separate electrodes, one being preferentially wet by polysulfide and being adapted to operate on charge and the other being preferentially wet by sulfur and being adapted to operate on discharge. While such batteries or cells are effective in increasing energy efficiency on both charge and discharge, the cell construction is complicated by the use of two separate electrodes.

U.S. patent application Ser. No. 653,856 filed concurrently herewith and entitled "Secondary Battery with Separate Charge and Discharge Zones" teaches a battery which exhibits excellent energy efficiency on charge and discharge. However, that device comprises separate storage, charge and discharge zone and, thus, is somewhat complicated.

The secondary battery or cell of this invention, like that of the dual electrode device and the device comprising storage zones, increase energy efficiency on both charge and discharge. In addition, the device provides a greater power and energy density than those devices.

BRIEF DESCRIPTION OF THE INVENTION

The improvement of this invention comprises a composite electrode which comprises:
  a. at least one first portion of porous conductive material which
    i. is disposed adjacent to said cation-permeable barrier and is in electrical contact therewith,
    ii. is contiguous at least in part with said cation-permeable barrier and
    iii. is formed of a material which, during operation of said battery or cell, exhibits a contact angle with said molten polysulfide which is less than the contact angle it exhibits with sulfur, and
  b. at least one second portion of porous material which
    i. is disposed adjacent to said at least one first portion and is contiguous at least in part therewith,
    ii. is in electrical contact with said cation-permeable barrier and
    iii. is formed of a material which, during operation of said cell, exhibits a contact angle with said molten sulfur which is less than the contact angle it exhibits with said molten polysulfide.

The one or more first portions serve as primarily as the electrode during charge of the battery or cell and serve primarily to wick molten polysulfide away from the one or more second portions during discharge. The one or more second portions serve primarily as the electrode during discharge of the battery or cell and serve primarily to wick molten sulfur away from the one or more first portions during charge.

The invention will be more fully understood after reading the following detailed description thereof in conjunction with the drawings in which:

FIG. 1 is a vertical sectional view of a cell showing one embodiment of the invention;

FIGS. 2 and 3 are illustrations of cross-sections suitable for the design shown in FIG. 1;

FIG. 4 is a broken away lower vertical section of a cell similar to that of FIG. 1, but with a different electrode design;

FIG. 5 is a cross-section of a suitable electrode design such as is illustrated in FIG. 4; and FIG. 6 is a sectional view of a third type of cell design embodying the improvement of the invention.

DETAILED DESCRIPTION OF THE INVENTION

Description of Device to which Improvement Applies

The type of secondary or rechargeable electrical conversion devices to which the improvement of this invention applies and various components thereof are disclosed in the following U.S. patents, the disclosures of which are incorporated herein by reference: U.S. Pat. Nos. 3,404,035; 3,404,036; 3,446,677; 3,458,356; 3,468,709; 3,468,719; 3,475,220; 3,475,223; 3,475,225; 3,535,163; 3,719,531 and 3,811,493.

As mentioned above, the secondary batteries or cells to which the improvement of this invention applies comprise generally: (1) an anodic reaction zone containing a molten alkali metal reactant-anode in electrical contact with an external circuit; (2) a cathodic reaction zone containing (a) a cathodic reactant comprising a liquid electrolyte selected from sulfur or a mixture of sulfur and sulfur saturated polysulfide of said molten alkali metal reactant which is electrochemically reversibly reactive with said anodic reactant and (b) an electrode which is at least partially immersed in said cathodic reactant and (3) a cation-permeable barrier to mass liquid transfer interposed between and in contact with said anodic and cathodic reaction zones, said electrode being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alakali metals, or alloys containing such alkali metals can be used.

The cathodic reactant of the fully charged battery or cell is molten sulfur, which is electrochemically reversibly reactive with the anodic reactnat. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

Since in the fully discharged state the polysulfide melt is single phase in nature, the activity of sulfur in the melt is substantially less than unity when the mole fraction of sulfur is about 0.60 and approaches unity as the mole fraction approaches 0.72, the point at which the polysulfide is sulfur saturated. As the cell is recharged, elemental sulfur is formed momentarily on the surfaces of the electrode in the vicinity of the solid ceramic electrolyte. Since sulfur is nonconductive, the presence of elemental sulfur on the electrode could cause difficulty in continuing the recharging process. However, when the mole fraction of sulfur in the melt is between about 0.60 and about 0.72, i.e., the single phase region, the sulfur which forms on the surface of the electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltate becomes constant.

As charging of the cell or battery continues, the sulfur saturated polysulfide will no longer react with elemental sulfur deposited on the electrode to form polysulfide having a greater mole ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficultites are confronted because of the formation of large amounts of nonconductive elemental sulfur on porous electrode surfaces. In fact, it is extremely difficult to recharge such secondary cells or batteries to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as reaction zone separators of solid electrolytes are bi- or multi-metal oxides. Among the polycrystalline bi- or multi-metal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al-O bond chains with sodium ions occupying sites between the aforementioned layers and columns. Among the numerous polycrystalline Beta-type-alumina materials useful as reaction zone separators or solid electrolytes are the following.

1. Standard Beta-type-alumina which exhibits the above-discussed crystalline structure comprising a series of layers of aluminum oxide held apart by layers of linear Al—O bond chains with sodium occupying sites between the afore-mentioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline is $\beta''$-alumina which may be represented by the formula $Na_2O \cdot 6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.
3. Substituted Beta-type-alumina wherein the sodium ions of the composition are replaced in part or in whole with other positive ions which are preferably metal ions.
4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode is in electrical contact with the cation-permeable barrier and an external circuit. The conductive material is of significantly greater surface area than a solid cathode and may comprise any porous material which is electronically conductive and which is resistant to attack by reactants within the cathodic reaction zone. While the secondary cells or batteries to which the improvement of this invention is applicable may have a number of different configurations, several of which are disclosed in the above-incorporated patents, a preferred configuration comprises: (1) a container, preferably tubular; (2) a cation-permeable barrier to mass liquid transfer, preferably tubular, which is disposed within said container so as to create an anodic reaction zone within said barrier and a cathodic reaction zone between said barrier and said container; (3) a molten alkali metal anodic reactant within said anodic reaction zone in electrical contact with an external electrical circuit; (4) a cathodic reactant comprising a liquid electrolyte which is electrochemically reversibly reactive with said anodic reactant and which, is at least the partially discharged state is selected from the group consisting of (a) a single phase composition comprising molten polysulfide salts of said anodic reactant and (b) a two phase composition comprising molten sulfur and molten sulfur saturated polysulfide salts of said anodic reactant; and (5) an electrode which is disposed within said cathodic reaction zone, filled at least in part with said cathodic reactant and is in electrical contact with both said barrier and said external circuit. Such secondary cells which are preferably tubular or cylindrical, thus comprise cathodic reaction zones which completely surround the solid electrolyte or reaction zone separator.

IMPROVEMENT OF THE INVENTION

The improvement of this invention comprises employing as the electrode in the aforementioned devices a composite electrode which comprises:

(A) at least one first portion of porous conductive material which (i) is disposed adjacent to the cation-permeable barrier and is in electrical contact therewith, (ii) is contiguous at least in part, with the barrier and (iii) is formed of a material which, during operation of the device, is more readily wettable by molten polysulfide salts than it is by molten sulfur; and (B) at least one second portion of porous conductive material which (i) is disposed adjacent to the first portion or portions and is contiguous therewith, (ii) is in electrical contact with the cation-permeable barrier and (iii) is formed from a material which is more readily wettable by molten sulfur than by molten polysulfide.

During operation of the battery or cell embodying this improved composite electrode the one or more first portions serve primarily as the electrode during charge and serve primarily to wick molten polysulfide away from the second portion or portions during discharge. The one or more second portions, on the other hand serve primarily as the electrode during discharge and serve primarily to wick sulfur away from the one or more first portions during charge. The result is a battery or cell which exhibits increased energy efficiency on both charge and discharge as well as an increased power and energy density as compared to prior art devices of this type.

The measure of wettability of substrate by a liquid material is the contact angle formed between the liquid and the substrate. If the liquid wets the substrate completely the contact angle will be 0°. If the liquid beads up completely on the substrate, the contact angle will be 180°. Thus, the lower the contact angle between the liquid and the substrate the greater the wettability of the substrate by the liquid. For example, in helium at 318°C the contact angle formed by molten $Na_2S_4$ on graphite is approximately 100° while the contact angle formed by molten sulfur on graphite is approximately 25°. Thus, graphite is preferentially wet by sulfur as opposed to polysulfide salts. As such, a graphite material such as a graphite felt is ideal for use as the second or discharging portion of the electrode and unsuitable unless modified to make it preferentially wettable by polysulfide, as the first or charging portion(s) of the electrode in the improvement of this invention.

It has been found that by employing conductive materials which are preferentially wettable by polysulfide salts and by sulfur as the first or charging and second or discharging portion(s) of the electrode respectively it is possible to substantially reduce or eliminate electrode polarization while either charging or discharging. As a result, the batteries or cells made in accordance with the improvement of this invention demonstrates good electrical efficiency on both charge and discharge, and as such, are ideal for a number of uses such as for electric utility load levelling.

The term "porous conductive material" as used in this application is intended to mean any of the compositions within the purview of the invention which is in the form of: a perforated material; an expanded material; a felt; a woven or nonwoven fabric; a sintered material; a foam; a flame sprayed material; and other forms which will be apparent to the skilled artisan.

Among the numerous materials which are preferentially wettable by polysulfide salts, and which are therefore preferred materials for use as the first or charging portion(s) of the electrode discussed above are: (1)

metals, which as used herein shall include alloys as well as such metals or alloys having an oxidized surface(s). A preferred metal for use in the invention is stainless steel. It has been found, for example, that no electrode polarization occurs at a stainless steel AISI No. 446 electrode at 330° C while charging in the two phase region. The contact angle in helium at 318° C formed by $Na_2S_4$ on AISI No. 446 stainless steel is 0–5°, while the contact angle formed by sulfur on stainless steel is approximately 25°. These contact angles remain the same independent of the thickness of the oxide layer on the stainless steel (i.e., the virgin stainless steel can be abraded so as to remove old oxide, can be oxidized in hot nitric acid, etched in HCl, oxidized in air at 800° C, or used untreated). Thus, in all cases the stainless steel is preferentially wetted by sodium polysulfide. All metals which have been exposed to air are covered to a greater or lesser extent, depending on the particular metal, with an oxide coating. Since oxides are particularly stable to molten sulfur and molten alkali metal polysulfides, such as sodium polysulfide, it becomes advantageous to further oxidize the metal surfaces, either by oxidation at elevated temperatures or by attack by oxidizing acids. It is understood that metals and alloys, as used herein, can be either coated with oxide due to normal exposure to an ambient atmosphere or may be specially treated to thicken their oxide coatings, (2) Materials having a surface consisting of and including materials formed completely of a composition of a polar or ionic character or with unfilled d-orbitals. Such compositions include oxides or sulfides of metal selected from the group consisting of a) metals of Group I, II and III of the Periodic Table of Elements, b) Transition Series Metals, and c) tin, lead, antimony and bismuth. Preferentially, the metal salts or oxides are highly insoluble in the sulfur and polysulfide phases. Preferred materials are: aluminum oxide ($Al_2O_3$); molybdenum disulfide ($MoS_2$); chromium trioxide ($Cr_2O_3$); lanthanum chromite ($LaCrO_3$); calcium doped lanthanum chromite ($La_{1-x}Ca_xCrO_3$); antimony pentoxide doped tin oxide ($Sb_2O_5 - SnO_2$); lithium doped nickel oxide ($Li_xNi_{1-x}O$); titanium doped iron oxide ($Ti_xFe_{2-x}O_3$); and tantalum doped titanium oxide ($Ta_2O_5-TiO_2$). Most of these materials are electronic conductors and can therefore serve as the electrode or can completely coat the electrode. Others of these materials such as aluminum oxide or chromium trioxide, are insulators and must therefore only partially cover the electrode surface.

3. Surface oxidized graphite. Graphite oxide can be prepared by the standard methods (e.g., graphite in a 1:2 v/v mixture of concentrated nitric and sulfur acids with solid potassium chlorate added or graphite in sulfuric acid containing sodium nitrate and potassium permanganate). Treatment of the graphite must be brief so that only the surface is oxidized. When this material is used as an electrode in an alkali metal/sulfur cell and heated in the presence of the cathodic reactant to operating temperatures, the graphitic oxide surface converts to graphite sulfide which is preferentially wet by the polysulfide.

4. Electrically conducting intercalated graphite Graphite bromide is formed by exposure of graphite felt electrodes to either liquid bromine or bromine vapor. Considerable bromine is retained in the graphite at the operating temperature of the cell. The graphite bromide surface is more wettable by polysulfides than the untreated graphite. Many materials can be reversibly intercalated in graphite. These materials all tend to make graphite more wettable by polysulfides. The intercalated graphite is prepared by heating the materials with the graphite.

5. Graphite which bears a continuous or discontinuous coating of one or more of the materials of (1), (2), (3) or (4); and 6. A combination or mixture of the material of (1), (2), (3), (4) or (5).

The various materials which will exhibit the required preferential wettability by sulfur and which, therefore, are suitable as the second or discharging portion(s) of the electrode will be apparent to those skilled in the art. However, some preferred materials include graphite felt or foam, porous graphite, vitreous carbon foam, pyrolytic graphite felt or foam, regidized graphite felt or foam, or materials which have been covered or coated with the above carbon materials.

FIG. 1 shows a full vertical section of a battery or cell which embodies the improvement of the invention. The device shown is the preferred tubular design discussed hereinbefore. FIGS. 2 and 3 are examples of several types of preferred cross sections for a cell such as shown in FIG. 1. FIG. 4 shows a broken away lower section of a similar cell embodying another type of electrode design in accordance with the invention and FIG. 5 shows a suitable cross-sectional design for such a cell. FIG. 6 shows still another cell embodying another type of electrode design. To the extent that the part or material described is shown in each of the figures it will be designated by the same numeral used to describe FIG. 1.

The cell shown in FIG. 1 comprises: a tubular container 4; a tubular cation-permeable barrier to mass liquid transfer 6 which is disposed within said tubular container 4 so as to create an anodic reaction zone within the tubular barrier containing a molten alkali metal reactant-anode 8 which is in electrical contact via lead 10 to an external circuit; a cathodic reaction zone between tubular barrier 6 and tubular container 4; a molten cathodic reactant 12; and a composite porous electrode generally indicated at 14. As shown in FIG. 1, the composite electrode comprises a first or charging portion 14' which is preferentially wet by molten polysulfide and a second or discharging portion 14" which is preferentially wet by sulfur. It will be noted that first portion 14' is adjacent to cation-permeable barrier 6 and is contiguous therewith. Second portion 14" is disposed adjacent to first portion 14' and is contiguous therewith. In the particular electrode design shown in FIG. 1, first portion 14' substantially covers cation-permeable barrier 6 and second portion 14" substantially covers portion 14'. When such a design is used it is necessary that first portion 14' be sufficiently thin and porous so as to allow ions to pass therethrough. The optimal thickness of portion 14' will depend on the material selected and the degree of porosity thereof. Generally, however, it is desirable to employ a first portion 14' which is 3mm or less in thickness and preferably 1mm or less. There thicknesses are particularly suitable for the instance where first portion 14' is a perforated or expanded metal sheet. As shown, the composite electrode of FIG. 1 makes electrical contact with the external circuit via lead 16 which contacts first portion 14.

The cross-sectional view of FIG. 2 shows an embodiment wherein first portion 14' is wrapped around cation-permeable barrier 6 so as to substantially cover it and second portion 14" substantially covers first portion 14'. First portion 14' is sufficiently porous so as to allow second portion 14" to be in partial contact, i.e., contiguous with barrier 6. The porous screen shown in the cross section as portion 1 is merely representative of porous materials which could be used.

The cross-sectional view of FIG. 3 shows an embodiment similar to that of FIG. 1, wherein a porous cloth serves as portion 14' and second portion 14" substantially covers first portion 14' but does not contact barrier 6.

The sectional view of FIG. 4 shows a design which, unlike these shown in FIGS. 2 through 3, employs a second portion which substantially fills the area of said cathodic reaction zone between first portion 14' and container 4. In the design shown in FIG. 4 first portion 14' substantially covers barrier 6 and second portion 14" does not partially cover barrier 6. However, a design in which a porous portion 14' as shown in FIG. 2 is used and second portion 14" contacts barrier 6 also may be used.

FIG. 5 shows a cross-section of a design similar to that of FIG. 4. This design is representative of those wherein the porous conductive material of section portion 14' is disposed within the cathodic reaction zone such that the zone contains a plurality of channels or spaces 18 which are free of the porous conductive material and which, in combination with the porous conductive material, are adapted to allow flow within the zone of the cathodic reactant 12 during operation of the battery or cell. The design shown in FIG. 5 is merely representative of a number of designs which are suitable. Other designs for this type of electrode structure are shown in the aforementioned U.S. Ser. No. 545,048.

FIG. 6 shows still another design of an embodiment which is representative of another type of design in accordance with the invention. The electrode of this device comprises a plurality of first portions 14' and second portions 14". The portions 14' and 14" are disposed adjacent and contiguous to each other along the length of the cation-permeable barrier 6. Each of the portions 14' and 14" shown in the figure is a toroid which is disposed about the tubular barrier 6. Open spaces 20 to allow flow of cathodic reactant are shown within the cathodic reaction zone between first portions 14' and container 4. In the preferred design shown in FIG. 6 the cell is disposed horizontally with tubular barrier 6 extending in a lateral direction. As shown, the electrical contact with electrode 14 and cation-permeable barrier 6 may be via electrode lead 22 which is attached to conductive container 4. In a preferred embodiment of the type shown first portions 14" are formed of perforated or porous metal.

In view of this disclosure, many modifications of this invention will be apparent to those skilled in the art. It is intended that all such modifications which fall within the scope of this invention be included within the terms of the appended claims.

I claim:
1. A secondary battery or cell comprising:
A. one or more anodic reaction zones containing a molten alkali metal reactant-anode in electrical contact with an external circuit;
B. one or more cathodic reaction zones containing (1) a cathodic reactant which, when said battery or cell is at least partially discharged, is selected from the group consisting of (i) a single phase composition comprising molten polysulfide salts of said anodic reactant and (ii) a two-phase composition molten sulfur and molten sulfur saturated polysulfide salts of said anodic reactant and (2) an electrode which is at least partially immersed in said cathodic reactant; and
C. a cation-permeable barrier to mass liquid transfer interposed between and in contact with said anodic and cathodic reaction zones, said electrode being in electrical contact with both said cation-permeable barrier and said external circuit, wherein the improvement comprises a composite electrode comprising
a. at least one first portion of porous conductive material which
  i. is disposed adjacent to said cation-permeable barrier and is in electrical contact therewith,
  ii. is contiguous at least in part with said cation-permeable barrier and
  iii. is formed of a material which, during operation of said battery or cell, exhibits a contact angle with said molten polysulfide which is less than the contact angle it exhibits with sulfur, and
b. at least one second portion of porous material which
  i. is disposed adjacent to said at least one first portion and is contiguous at least in part therewith,
  ii. is in electrical contact with said cation-permeable barrier and
  iii. is formed of a material which, during operation of said cell, exhibits a contact angle with said molten sulfur which is less than the contact angle it exhibits with said molten polysulfide,
said at least one first portion serving primarily as the electrode during charge of said battery or cell and serving primarily to wick molten polysulfide away from said at least one second portion during discharge and said at least one second portion serving primarily as the electrode during discharge of said battery or cell and serving primarily to wick molten sulfur away from said at least one first portion during charge.

2. A device in accordance with claim 1 wherein said at least one second portion is contiguous in part with said cation-permeable barrier.

3. A device in accordance with claim 1 wherein said at least one first portion covers said cation-permeable barrier, but is sufficiently thin and porous so as to allow ions to pass therethrough, and said at least one second portion substantially covers said at least one first portion but does not contact said cation-permeable barrier.

4. A device in accordance with claim 2 wherein said first and second portions are alternatively disposed adjacent and contiguous to each other along the length of said cation-permeable barrier.

5. A device in accordance with claim 2 wherein said first portion substantially covers said cation-permeable barrier and said second portion substantially covers said first portion, said first portion being sufficiently porous so as to allow said second portion to be in partial contact with said cation-permeable barrier.

6. A device in accordance with claim 2 wherein said at least one first portion is formed from a material selected from the group consisting of:
1. a metal;
2. materials having a surface consisting of an oxide or sulfide of a metal selected from the group consisting of (i) metals of Groups I, II and III of the Periodic Table of Elements (ii) Transition Series Metals and (iii) tin, lead, antimony and bismuth;
3. surface oxidized graphite;
4. intercalated graphite;
5. graphite coated with materials of (1), (2), (3) or (4), and
6. a mixture of materials of (1), (2), (3), (4) or (5).

7. A device in accordance with claim 2 wherein said at least one second portion is selected from the group consisting of: graphite felt, graphite foam porous graphite, vitreous carbon foam, pyrolytic graphite felt, pyrolytic graphite foam, and materials coated with the same.

8. A device in accordance with claim 6 wherein said at least one first portion comprises a material having a surface selected from the group consisting of: aluminum oxide ($Al_2O_3$), molybdenum disulfide ($M_oS_2$), Chromic oxide ($CrO_3$), lanthanum chromite ($La_{1-x}Ca_xCrO_3$), antimony pentoxide doped tinoxide ($Sb_2O_5$-$SrO_2$), lithium doped nickel oxide ($Li_xNi_{1-x}O$); titanium doped iron oxide ($Ti_xFe_{2-x}O_3$), and tantalum doped titanium oxide ($Ta_2O_5$-$TiO_2$).

9. A device in accordance with claim 8 wherein said at least one first portion is 3mm or less in thickness.

10. A device in accordance with claim 8 wherein said at least one first portion is formed from a material selected from the group consisting of:
1. a metal;
2. materials having a surface consisting of an oxide or sulfide of a metal selected from the group consisting of (i) metals of Groups I, II and III of the Period Table of Elements, (ii) Transition Series Metals and (iii) tin, lead, antimony and bismuth;
3. surface oxidized graphite;
4. intercalated graphite;
5. graphite coated with materials of (1), (2), (3) or (4); and
6. a mixture of (1), (2), (3), (4) or (5).

11. A device in accordance with claim 3 wherein said at least one second portion is selected from the group consisting of: graphite felt, graphite foam, porous graphite, vitreous carbon foam, pyrolytic graphite felt, pyrolytic graphite foam and materials coated with the same.

12. A device in accordance with claim 10 wherein said at least one first portion comprises a material having a surface selected from the group consisting of: aluminum oxide ($Al_2O_3$), molybdenum disulfide ($M_oS_2$), Chromic oxide ($CrO_3$), lanthanum chromite ($La_{1-x}Ca_xCrO_3$), antimony pentoxide doped tinoxide ($Sb_2O_5$-$SrO_2$), lithium doped nickel oxide ($Li_xNi_{1-x}O$), titanium doped iron oxide ($Ti_xFe_{2-x}O_2$) and tantalum doped titanium oxide ($Ta_2O_5$-$TiO_2$).

13. A device in accordance with claim 1 wherein said electrode is in direct electrical contact with said external circuit through said first portion.

14. A secondary battery or cell comprising:
A. a container;
B. a cation-permeable barrier to mass liquid transfer which is disposed within said container so as to create an anodic reaction zone within said barrier and a cathodic reaction zone between said barrier and said container;
C. a molten alkali metal anodic reactant within said anodic reaction zone in electrical contact with an external circuit;
D. a cathodic reactant comprising a liquid electrolyte which is electrochemically reversibly reactive with said anodic reactant and which, when said cell or battery is in at least a partially discharged state, is selected from the group consisting of (a) a single phase composition comprising molten polysulfides salts of said anodic reactant and (b) a two-phase composition comprising molten sulfur saturated polysulfide salts of said anodic reactant; and
E. an electrode is disposed within said cathodic reaction zone, filled at least in part with said cathodic reactant and which is in electrical contact with both said barrier and said external circuit, wherein the improvement comprises a composite electrode comprising:
a. at least one first portion of porous conductive material which
(i) is disposed adjacent to said cation-permeable barrier and is in electrical contact therewith,
(ii) is contiguous at least in part with said cation-permeable barrier and
(iii) is formed of a material which, during operation of said battery or cell, exhibits a contact angle with said molten polysulfide which is less than the contact angle it exhibits with molten sulfur, and
b. at least one second portion of porous conductive material which
(i) is disposed adjacent to said at least one first portion and is contiguous at least in part therewith,
(ii) is in electrical contact with said cation-permeable barrier and
(iii) is formed of a material which, during operation of said cell, exhibits a contact angle with said molten sulfur which is less than the contact angle it exhibits with said molten polysulfide,
said at least one first portion serving primarily as the electrode during charge of said battery or cell and serving primarily to wick molten polysulfide away from said at least one second portion during discharge, and said at least one second portion serving primarily as the electrode during discharge of said battery or cell and serving primarily to wick molten sulfur away from said at least one first portion during charge.

15. A device in accordance with claim 14 wherein said at least one second portion is contiguous in part with said cation-permeable barrier.

16. A device in accordance with claim 14 wherein said at least one first portion covers said cation-permeable barrier, but is sufficiently thin and porous so as to allow ions to pass therethrough, and said at least one second portion substantially covers said at least one first portion, but does not contact said cation-permeable barrier.

17. A device in accordance with claim 14 wherein said electrode is in direct electrical contact with said external circuit through said first portion.

18. A device in accordance with claim 15 wherein said first and second portions are alternatively disposed adjacent and contiguous to each other along the length of said cation-permeable barrier.

19. A device in accordance with claim 15 wherein said first portion substantially covers said cation-permeable barrier and said second portion substantially covers said first portion, said first portion being sufficiently porous so as to allow said second portion to be in partial contact with said cation-permeable barrier.

20. A device in accordance with claim 15 wherein:
a. said at least one first portion is selected from the group consisting of
1. a metal
2. materials having a surface consisting of an oxide or sulfide of a metal selected from the group consisting of (i) metals of Groups I, II and III of the Periodic Table of Elements, (ii) Transition Series Metals, and (iii) tin, lead, antimony and bismuth;
3. surface oxidized graphite;
4. intercalated graphite;
5. graphite coated with materials of (1), (2), (3) or (4); and
6. a mixture of (1), (2), (3), (4) or (5); and
b. said at least one second portion is selected from the group consisting of
1. graphite felt;
2. porous graphite
3. graphite foam;
4. vitreous carbon foam;
5. pyrolytic graphite felt;
6. pyrolytic graphite foam; and
7. materials coated with (1)-(6).

21. A device in accordance with claim 18 wherein said cation-permeable barrier is tubular and said first and second portions are toroids disposed around said tube.

22. A device in accordance with claim 21 wherein said first portions are formed of perforated or porous metal 23. A device in accordance with claim 21 wherein there exists an open volume between said first portions and said container.

24. A device in accordance with claim 21 wherein said cell is disposed horizontally with said cation-permeable barrier extending in a lateral direction.

25. A device in accordance with claim 19 wherein said porous conducture material of said second portion is disposed within said cathodic reaction zone such that said zone contains a plurality of channels or spaces which are free of said porous conductive material and which, in combination with said porous conductive material, are adapted to allow flow within said zone of said cathodic reactant during operation of said battery or cell.

26. A device in accordance with claim 19 wherein said first portion comprises a perforated or expanded metal sheet.

27. A device in accordance with claim 16 wherein said porous conductive material of said second portion is disposed within said cathodic reaction zone such that said zone contains a plurality of channels or spaces which are free of said porous conductive material and which in combination with said porous conductive material are adapted to allow flow within said zone of said cathodic reactant during operation of said battery or cell.

28. A device in accordance with claim 16 wherein said first portion comprises a perforated or expanded metal sheet.

29. A device in accordance with claim 16 wherein said first portion is 3mm or less in thickness.

30. A device in accordance with claim 16 wherein said first portion is 1mm or less in thickness.

31. A device in accordance with claim 16 wherein
a. said first portion is selected from the group consisting of
1. a metal;
2. materials having a surface consisting of an oxide or sulfide of a metal selected from the group consisting of (i) metals of Groups I, II and III of the Periodic Table of Elements (ii) Transistion Series Metals and (iii) tin, lead, antimony and bismuth;
3. surface oxidized graphite;
4. intercalated graphite;
5. graphite coated with materials of (1), (2), (3) or (4), and
6. a mixture of materials of (1), (2), (3), (4) or (5); and
b. said second portion is selected from the group consisting of
1. graphite felt;
2. porous graphite;
3. graphite foam;
4. vitreous carbon foam;
5. pyrolytic graphite felt;
6. pyrolytic graphite foam; and
7. materials coated with (1)-(6).

* * * * *